United States Patent
Jones

(10) Patent No.: US 8,938,598 B2
(45) Date of Patent: Jan. 20, 2015

(54) FACILITATING SIMULTANEOUS SUBMISSION TO A MULTI-PRODUCER QUEUE BY MULTIPLE THREADS WITH INNER AND OUTER POINTERS

(75) Inventor: Stephen Jones, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 609 days.

(21) Appl. No.: 13/177,340

(22) Filed: Jul. 6, 2011

(65) Prior Publication Data
US 2013/0014118 A1 Jan. 10, 2013

(51) Int. Cl.
- G06F 9/50 (2006.01)
- G06F 9/52 (2006.01)
- G06F 9/54 (2006.01)
- G06F 12/02 (2006.01)

(52) U.S. Cl.
CPC ...... *G06F 9/52* (2013.01); *G06F 12/02* (2013.01); *G06F 9/544* (2013.01); *G06F 2209/548* (2013.01); *G06F 2209/5018* (2013.01)
USPC .......................................... 711/170; 718/104

(58) Field of Classification Search
CPC ......... G06F 9/544; G06F 9/52; G06F 9/5016; G06F 9/50; G06F 5/12; G06F 12/02; G06F 2209/5018; G06F 2209/548
See application file for complete search history.

(56) References Cited

U.S. PATENT DOCUMENTS

| | | | |
|---|---|---|---|
| 6,145,061 A * | 11/2000 | Garcia et al. ............... | 711/154 |
| 6,212,543 B1 | 4/2001 | Futral | |
| 6,988,186 B2 * | 1/2006 | Eickemeyer et al. ........ | 712/217 |
| 7,243,354 B1 * | 7/2007 | Chhabra et al. ............. | 719/314 |
| 7,865,638 B1 | 1/2011 | Wyatt | |
| 7,970,927 B1 * | 6/2011 | Shao et al. ................... | 709/234 |
| 2002/0174302 A1 | 11/2002 | Frank | |
| 2012/0331470 A1 * | 12/2012 | Jones et al. .................. | 718/102 |

OTHER PUBLICATIONS

Letter, dated May 1, 2013, to UK Intellectual Property Office, responding to Search and Examination Report (dated Oct. 30, 2012) in Application No. GB1211901.2 (3 pages).*
UK Search Report dated Oct. 30, 2012, Application No. GB1211901.2.

* cited by examiner

*Primary Examiner* — Sanjiv Shah
*Assistant Examiner* — Glenn Gossage
(74) *Attorney, Agent, or Firm* — Patterson & Sheridan, LLP

(57) ABSTRACT

A technique for ensuring that multiple producer threads may simultaneously write entries in a shared queue and one or more consumers may read valid data from the shared queue. Writing of the shared queue by the multiple producer threads may occur in parallel and the one or more consumer threads may read the shared queue while the producer threads write the shared queue. A "wait-free" mechanism allows any producer thread that writes a shared queue to advance an inner pointer that is used by a consumer thread to read valid data from the shared queue. The inner pointer indicates the most recent valid entry. An output pointer is advanced with an atomic operation to indicate a next entry or portion of memory in the shared queue that is available for allocation. The shared queue may be implemented as a circular buffer.

20 Claims, 8 Drawing Sheets

FACILITATING SIMULTANEOUS SUBMISSION TO A MULTI-PRODUCER QUEUE BY MULTIPLE THREADS WITH INNER AND OUTER POINTERS

BACKGROUND OF THE INVENTION

1. Field of the Invention

The present invention generally relates to multi-threaded processing and more specifically to simultaneous submission to a multi-producer queue by multiple threads.

2. Description of the Related Art

During execution of a program by a multi-threaded processor, data generated by the program may be output by producer threads to a shared queue that is read by one or more consumer threads. The sections of the queue that contain valid data need to be indicated so that only valid data is read by the consumer threads. One conventional mechanism that ensures only valid data is read by consumer threads uses a per-entry or per-section "valid" bit that is set by the producer threads when the valid data is written and cleared by the consumer threads when the valid data is read. A drawback of using a per-entry or per-section "valid" bit is that the bit must be stored separately or in the queue and explicitly queried to determine whether or not each entry or section of the queue may be safely read.

A second conventional mechanism maintains a single "valid" pointer to an entry in the queue, behind which all data stored in the queue is valid and may be safely read by the consumer threads. When multiple producers may write the queue, care is required to maintain the "valid" pointer so that only "valid" data is stored behind the "valid" pointer. The multiple producers may be constrained to write the queue serially.

Accessing the shared queue may be further complicated if the producers may write data to the queue out of order. When multiple threads output without any coordination, the resulting data may be an unintelligible mix of data generated by the multiple threads as the program is executed.

Accordingly, what is needed in the art is an improved system and method for ensuring that multiple producer threads may simultaneously write entries in a shared queue and one or more consumers may read valid data from the shared queue. Importantly, writing of the shared queue by the multiple producer threads should not be serialized and the one or more consumer threads may read the shared queue while the producer threads write the shared queue.

SUMMARY OF THE INVENTION

One embodiment of the present invention sets forth a technique for ensuring that multiple producer threads may simultaneously write entries in a shared queue and one or more consumers may read valid data from the shared queue. Additionally, writing of the shared queue by the multiple producer threads may occur in parallel and the one or more consumer threads may read the shared queue while the producer threads write the shared queue.

Various embodiments of a method of the invention for submitting data to a shared queue by multiple producer threads include allocating a portion of memory in the shared queue for storing first thread output data to be written by a first producer thread of the multiple producer threads by advancing an outer pointer that indicates a next entry in the shared queue that is available for allocation, where the order in which the multiple producer threads store thread output data in the shared queue is different than the order in which contiguous portions of memory in the shared queue are allocated to the multiple producer threads. The first producer thread writes the first thread output data to the portion of memory and determines if the portion of the shared queue that was written was the only portion of memory in the shared queue that was allocated and had not been written. The first producer thread advances an inner pointer that indicates a last contiguous entry in the shared queue that has been submitted to the shared queue when the first producer thread determines that the portion of the shared queue that was written was the only portion of memory in the shared queue that was allocated and had not been written.

A "wait-free" mechanism allows any operation that accesses the shared queue (read or write) to be performed without any failure case forcing a retry or a permanent failure. Multiple producer threads and one or more consumer threads may simultaneously access the shared queue. Importantly, accesses are not serialized. Additionally, the shared queue may be circular or a fixed depth queue.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
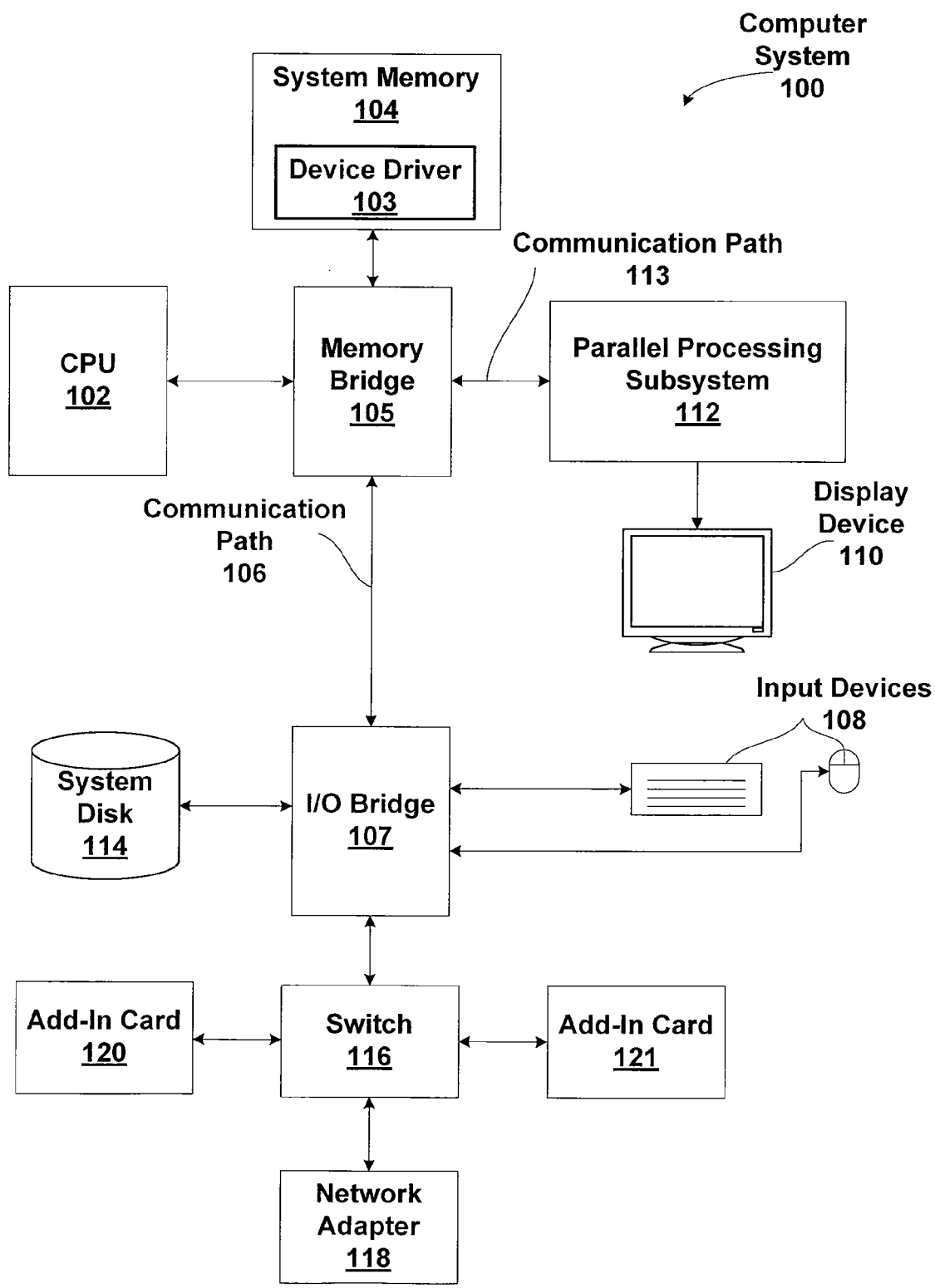
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a Peripheral Component Interconnect (PCI) Express (PCIe), Accelerated Graphics Port (AGP), or HyperTransport link); in one embodiment parallel processing subsystem 112 is a graphics subsystem that delivers pixels to a display device 110 (e.g., a conventional Cathode Ray Tube (CRT) or Liquid Crystal Display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including Universal Serial Bus (USB) or other port connections, Compact Disk (CD) drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
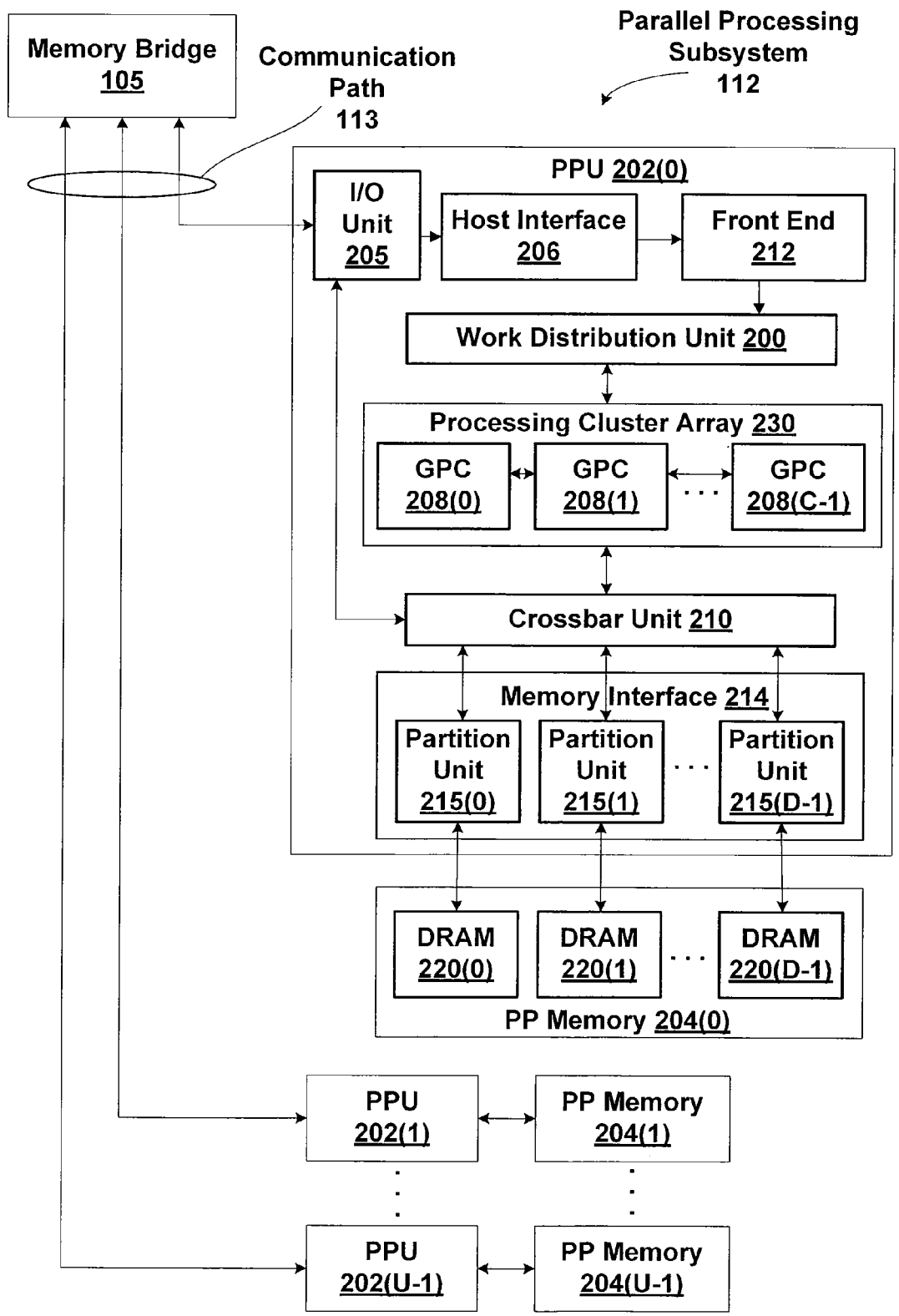
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and communications path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (or "push buffer") (not explicitly shown in either FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in pixel space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
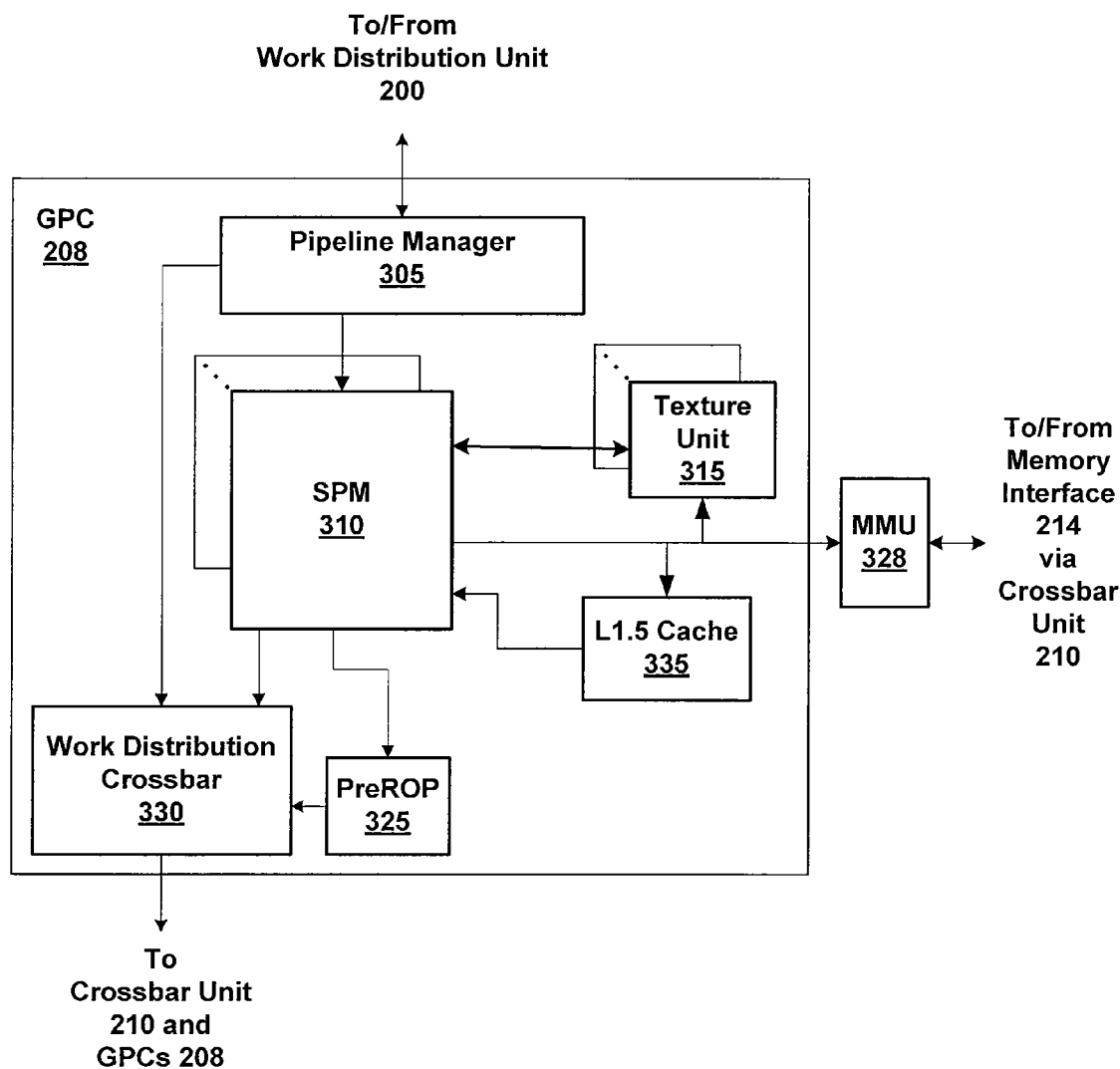
FIG. 3A is a block diagram of a general processing cluster (GPC) within one of the PPUs of FIG. 2, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
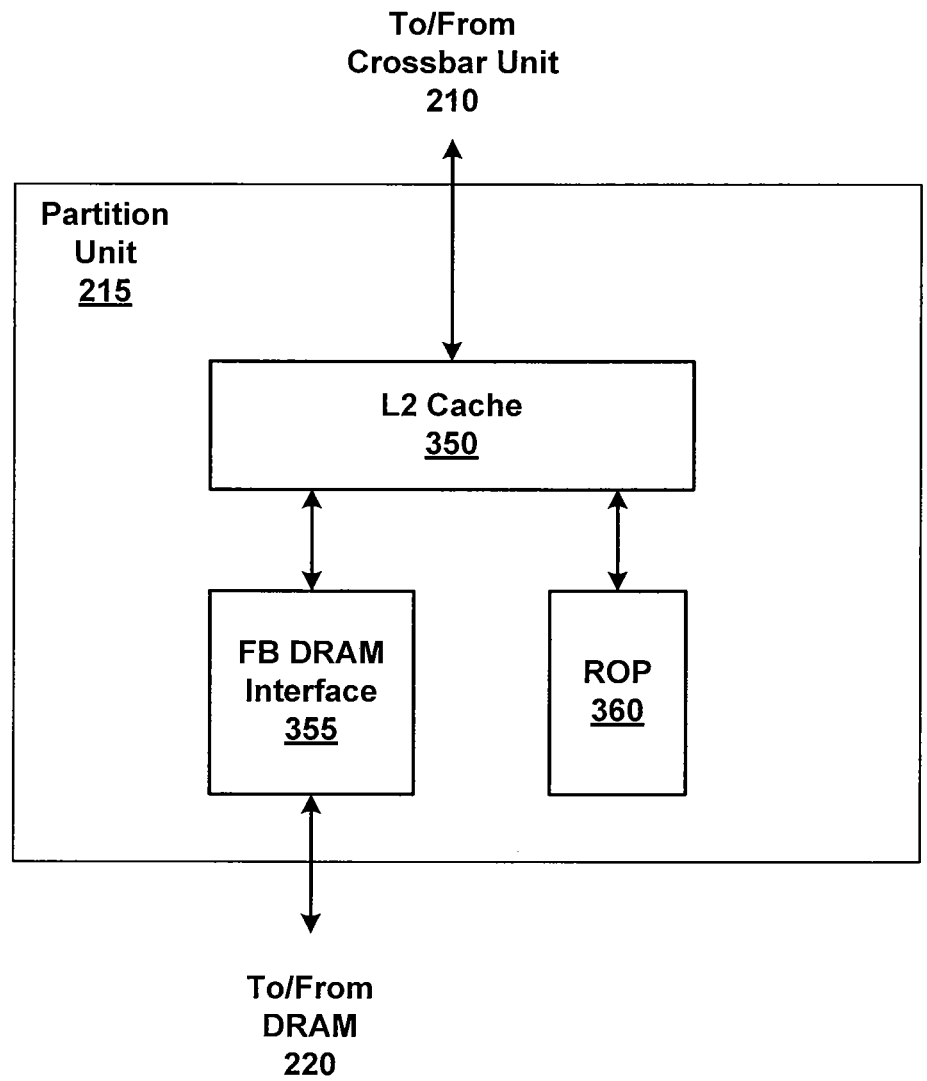
FIG. 3B is a block diagram of a partition unit within one of the PPUs of FIG. 2B, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
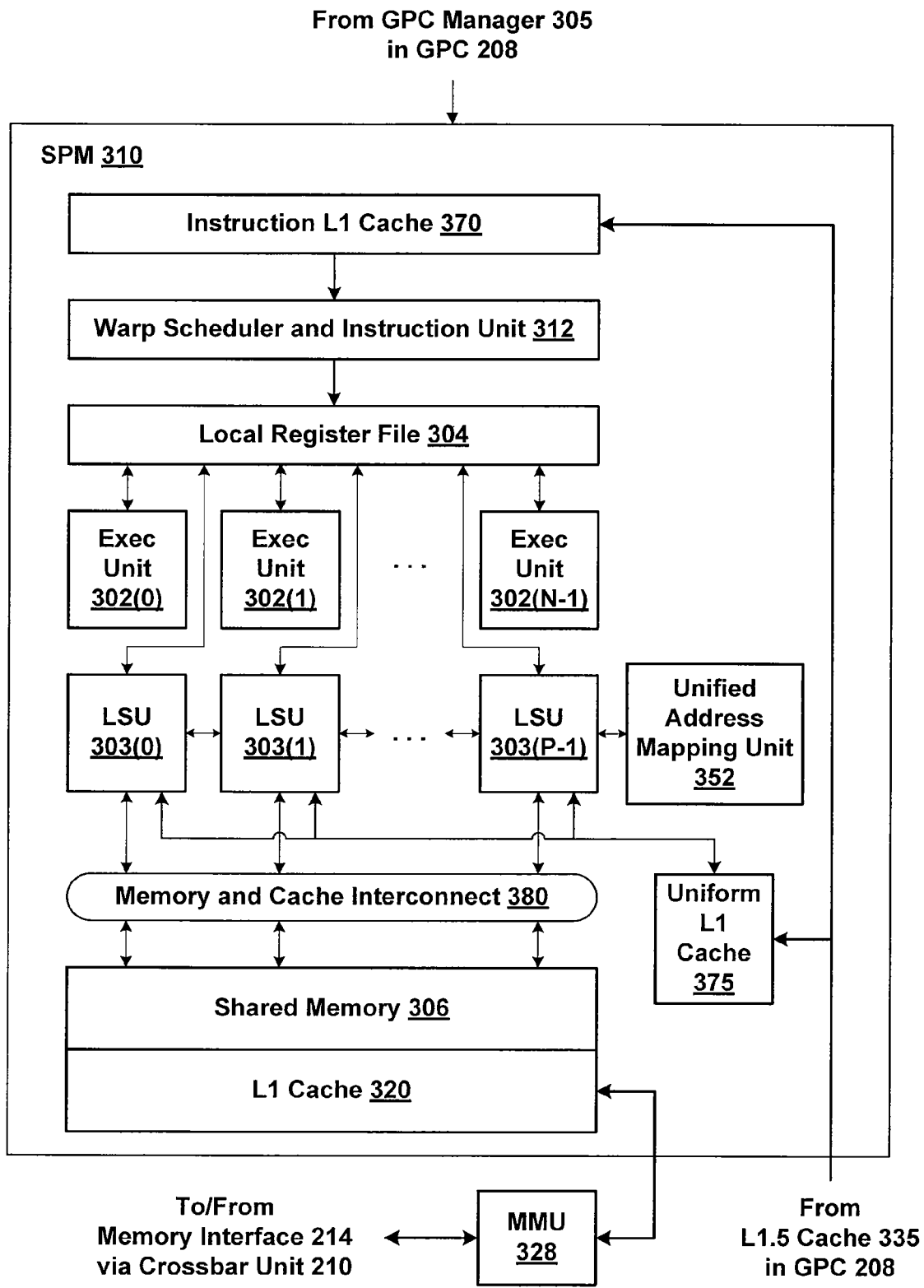
FIG. 3C is a block diagram of a portion of the streaming multiprocessor (SPM) of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on—chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 (FIG. 1) provides parameters to the parameter memory before directing SPM 310 to begin execution of a CTA that uses these parameters. Any CTA thread within any CTA (or any exec unit 302 within SPM 310) can access global memory through a memory interface 214 (FIG. 2). Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CIA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
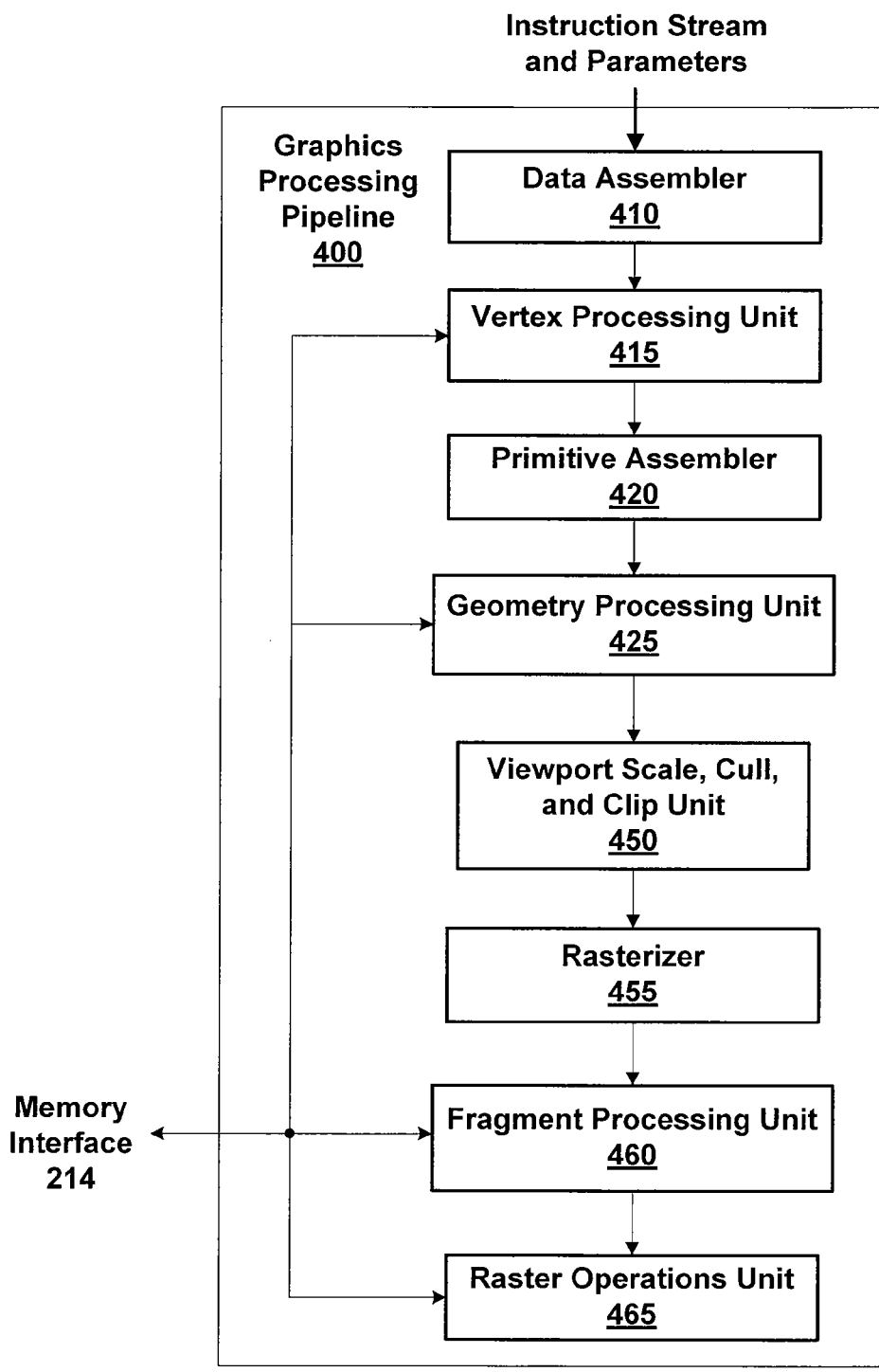
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Simultaneous Submission to a Shared Queue by Multiple Producers

A shared queue is a data structure that may include storage space for data that is written to the shared queue. The data structure may be stored in memory, where contiguous portions of the queue storage may be allocated by each producer thread. The multiple producer threads may write output data to the respective allocated portions of the shared queue. The output data must be written coherently, and may be written simultaneously or in an order that is different compared to the order in which the contiguous portions of the shared queue were allocated to the multiple producer threads. One or more consumers may read valid data from the shared queue at the same time as the producer threads write the shared queue and are allocated portions of the shared queue.

Instead of simply using a head pointer, as may be done when only a single producer and single consumer access the shared queue, when multiple producers access the shared queue two pointers are used: an outer pointer and an inner pointer. The outer pointer indicates a next entry in the shared queue that is available for allocation to a producer thread. The inner pointer indicates the most recent valid entry that may be read by a consumer thread in a contiguous stream of entries, i.e., the most recent contiguous entry in the shared queue that holds thread output written by a producer thread and has been submitted to the shared queue. As portions of the shared queue are allocated by producer threads, the outer pointer is advanced. As thread output is written to the portions of the shared queue by the producer threads, the inner pointer is advanced.

The outer pointer is advanced using an atomic operation so that one or more producer threads may advance the outer pointer simultaneously, i.e., in a single instruction. An atomic ADD (addition) operation may be used to add the requested allocation size for the producer thread to the outer pointer. Use of the atomic ADD operation means that contiguous portions of the shared queue may be allocated to multiple producer threads. For example, to allocate a contiguous portion of the buffer, a pointer to the current "next available" memory location can be incremented atomically by a thread. Using an atomic operation ensures that even if multiple producer threads advance the outer pointer simultaneously, each producer thread is allocated a different portion of the shared queue that is contiguous with previously allocated portions of the shared queue.

After receiving an allocation, each producer thread may write thread output data to its respective allocated portion of the shared queue. The thread output data for different producer threads may be written simultaneously or in an order that differs from the order in which the portions were allocated, as described in conjunction with FIGS. 5A-F.

Figure 5A:
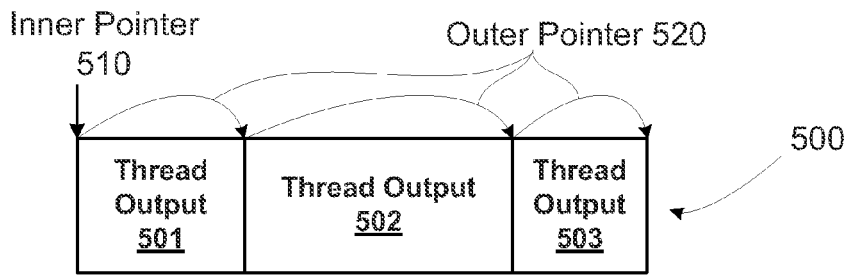
FIGS. 5A, 5B, 5C, 5D, 5E, and 5F illustrate the shared queue of thread data that is written by multiple threads and stored in memory, according to one embodiment of the invention.

FIG. 5A illustrates the shared queue 500 of thread data that is written by multiple threads and stored in memory, according to one embodiment of the invention. A coherent stream of thread outputs 501, 502, and 503 generated by multiple producer threads is stored in the shared queue 500. Before any portions of the shared queue 500 are allocated to store the thread outputs 501, 502, and 503, the outer pointer 520 points to the same entry as the inner pointer 510, namely, ahead of the first entry of the thread output 501.

When the portion of the shared queue 500 is allocated to a first producer thread for the thread output 501, the outer pointer 520 is advanced to point to the next available entry for allocation to a producer thread. When the producer thread allocation requests are received serially from a first, second, and third producer thread, the outer pointer 520 is sequentially advanced to the first entry following each of thread outputs 501, 502, and 503. When one or more of the producer threads request an allocation simultaneously, the outer pointer 520 is advanced past one or more portions that are simultaneously allocated. For example, when the first, second, and third producer threads request an allocation simultaneously, the outer pointer 520 is advanced from the first entry of the thread output 501 to the first entry beyond the thread output 503. The producer thread allocation is a "wait-free" operation because each producer thread requesting an allocation receives the allocation without waiting or polling the outer pointer 520.

In contrast, a conventional approach to allocating space in the shared queue 500 would be to use a lock—a mechanism which ensures that only a single producer thread can receive an allocation at a time. The lock ensures safe non-conflicting allocations, but at the penalty of serializing the allocations. To allow for parallel access of the shared queue 500, a lock-free algorithm is preferred whereby all producer threads are able to secure storage space for thread output in the shared queue unless the shared queue itself is full. When the outer pointer 520 is advanced using atomic ADD operations, the allocation of space for each producer thread is not only lock-free, but it is also wait-free.

The shared queue 500 is a contiguous section of memory accessible to both the multiple producer threads and the single consumer thread. The shared queue 500 may be stored in the PPU memory 204 or the system memory 104. The portions of the shared queue 500 allocated to the different producer threads should be contiguous with the last so that a consumer thread reads from the buffer as a stream. Also, the portions allocated to the different producer threads may be different sizes (as shown in FIGS. 5A-F) or may be equally sized.

As shown in FIG. 5A, the outer pointer 520 advances to point to the next available entry for allocation after a first thread is allocated a first portion of the buffer to store thread output 501. Then the outer pointer 520 advances to point to the next available entry for allocation after a second thread is allocated a second portion of the buffer to store the thread output 502. Finally, the outer pointer 520 advances to point to the next available entry for allocation after a third thread is allocated a third portion of the buffer to store the thread output 503.

The shared queue 500 is typically stored in physical memory and is therefore limited in size. To avoid allocating past the end of the buffer, it may be configured as a circular buffer. When the last memory location has been allocated the "next available" location moves back to the start of the buffer, e.g., at a base address. A challenge with a circular buffer is that atomic access is difficult—the increment of the inner pointer 510 or the outer pointer 520 may not be able to both add a number and wrap back to the start of the buffer at the base address in a single (atomic) operation. The use of an ever-increasing inner and outer pointer values ensures that the inner and outer pointers are not limited by the physical size of the buffer. The inner pointer 510 and outer pointer 520 may be absolute offsets relative to the base address and are divided through use of a modulus operator to produce a logical offset relative to the base address that can wrap back to the base address. The modulus of the outer pointer 520 with the shared queue length is the actual (logical) position in the shared queue for the next allocation. In other words an outer pointer offset used to identify the next entry for allocation is computed as ((outer pointer) modulus (shared queue length)). The physical address of the next entry for allocation is computed as the base address summed with the outer pointer offset identifying the next entry for allocation. Similarly, the last entry storing valid data for consumption is computed as the base address summed with an inner pointer offset, where the inner pointer offset is computed as ((inner pointer) modulus (shared queue length)).

Figure 5B:
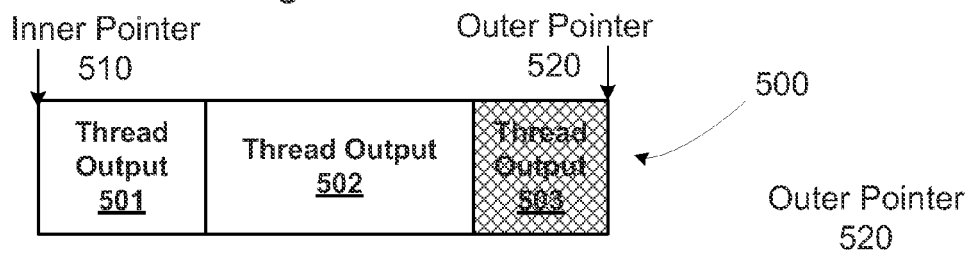

FIG. 5B illustrates the shared queue 500, according to one embodiment of the invention, after the third thread writes thread output data to the third portion of the shared queue 500. The third thread writes the thread output 503 to the third portion of the shared queue 500 before the first or second threads write thread data to the shared queue 500. The inner pointer 510 cannot be advanced after the thread output 503 is written because the thread outputs 501 and 502 have not been submitted.

Figure 5C:
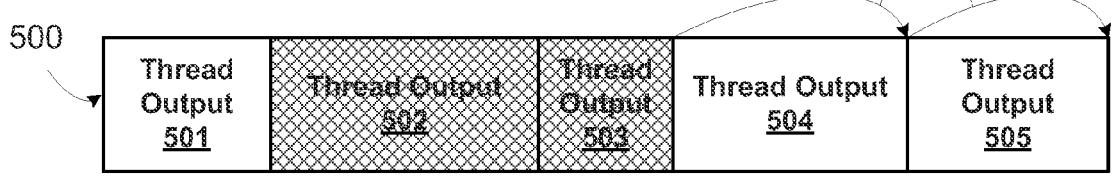

FIG. 5C illustrates the shared queue 500, according to one embodiment of the invention, after the thread output 503 is written. The second thread writes the thread output 502 to the second portion of the shared queue. The inner pointer 510 still may not be advanced because the thread output 501 has not been written. Additionally, a fourth and fifth portions of the shared queue 500 are allocated to a fourth and fifth threads. The outer pointer 520 is advanced to point to the next available entry for allocation beyond the last entry allocated to the fifth thread.

Figure 5D:
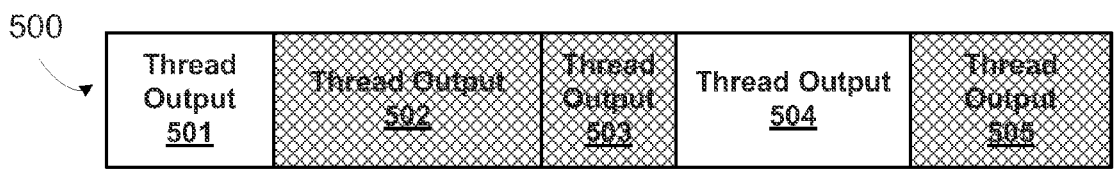

FIG. 5D illustrates the shared queue 500, according to one embodiment of the invention, when the fifth thread writes the thread output 505 to the fifth portion of the shared queue 500. The inner pointer 510 still may not be advanced because the thread output 501 has not been written.

Figure 5E:
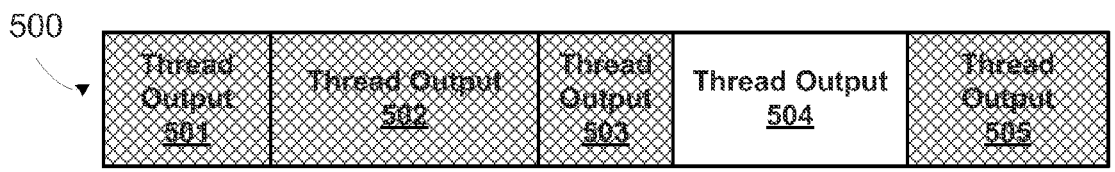

FIG. 5E illustrates the shared queue 500, according to one embodiment of the invention, when the first thread writes the thread output 501 to the first portion of the shared queue 500. The inner pointer 510 may now be advanced because the thread output 501 has been written. Because thread outputs 501, 502, and 503 have each been written, the inner pointer 510 may be advanced to point to the last entry of the thread output 503. However, to accomplish this, the first, second, and third threads would each need to advance the inner pointer in turn over the portion of the shared queue that is allocated to and written by each respective thread since the first thread may not have enough information to determine which other portions of the shared queue 500 have been written.

Each producer thread may be configured to advance the inner pointer 510 when the inner pointer 510 points to the beginning of the portion of the shared queue 500 that is allocated to and written by the particular producer thread. The producer thread then advances the inner pointer 510 to the end of the portion of the shared queue 500 that is allocated to and written by the producer thread. The producer thread's output data is "submitted" to the shared queue when the inner pointer 510 is advanced, thereby indicating that the producer thread's output data may be safely consumed. However, having each producer thread monitor and advance the inner pointer 510 effectively serialises the submission of output data by the producer threads. For example, the first thread would advance the inner pointer 510 to the last entry of the thread output 501, thus submitting the thread output 501; then the second thread would advance the inner pointer 510 to the last entry of the thread output 502 submitting the thread output 502; and the third thread would advance the inner pointer 510 to the last entry of the thread output 503 submitting the thread output 503. The second and third producer threads must continue to monitor the inner pointer 510 position after writing thread output 502 and thread output 503 and may be prevented from continuing to execute subsequent instructions until the inner pointer 510 is advanced.

A different technique may be used to advance the inner pointer 510 without serialisation. For the case shown in FIG. 5E, the first thread could advance the inner pointer 510 all the way to the last entry of the thread output 503 without requiring any action by the second or third threads. Such a technique would provide a "wait-free" mechanism whereby an operation, such as advancing the inner pointer 510, may be performed without forcing a retry (polling) or causing a permanent failure. Wait-free mechanisms are highly desirable in parallel programming, as they avoid interaction between parallel threads and undesired serialisation.

To advance the inner pointer in a wait-free manner, two additional values are maintained for the shared queue 500: a "maximum" value and a "complete" count. The maximum value tracks the most advanced entry into the shared queue 500 that has been completely written by a producer thread. The largest possible maximum value equals the outer pointer 520. The complete count tracks the total quantity of data completely written into the shared queue 500 by all producer threads. The maximum value and the complete count are both updated by each producer thread atomically once the data is completely written to the thread output allocated to the particular producer thread. The maximum value is updated by an atomic MAX (maximum) operation and the complete count is updated by an atomic ADD operation. Note that it the maximum value should be updated before the complete value is updated to avoid a race condition resulting from other producer threads updating and checking the maximum value and the complete count to advance the inner pointer 510.

When the maximum value and the complete count are equal, then the producer thread which has updated the complete count can determine that all data in the shared queue 500 up to the maximum value has been written. That producer thread can then advance the inner pointer 510. For the case shown in FIG. 5E, the first thread would not be able to advance the inner pointer to the last entry of thread output 503. This is because the maximum value will be at the last entry of thread output 505, while without thread output 504 being completed, the "complete" value will not equal the maximum value. Note that advancing the inner pointer 510 also requires an atomic MAX operation, in case additional parallel threads are advancing the inner pointer 510 at the same moment. By using the maximum value and the complete count, advancement of the inner pointer 510 becomes a wait-free operation for all producer threads. This wait-free mechanism guarantees in-order completion of a shared queue (or circular buffer), while enabling parallel accesses by multiple producer threads and one or more consumer threads.

Figure 5F:
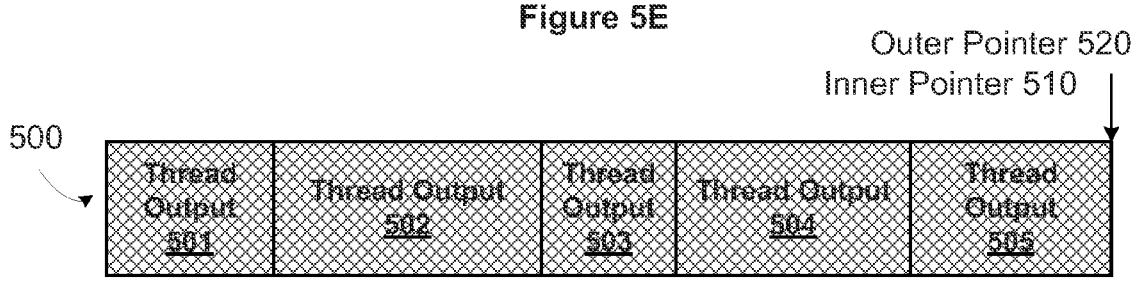

FIG. 5F illustrates the shared queue 500, according to one embodiment of the invention, when the fourth thread writes the thread output 504 to the fourth portion of the shared queue 500. After writing thread data to the thread output 504, the fourth thread updates the maximum value. However, the maximum value is unchanged by the atomic MAX operation because the thread output 505 has already been written and the maximum value equals the last entry of the shared queue 500 that is within the thread output 505. Therefore, the maximum value is greater than the last entry of the shared queue 500 that is within the thread output 504. The fourth thread then updates the complete count using an atomic ADD operation to accumulate the amount of data (e.g., bytes) written to the thread output 504 by the fourth thread into the complete count. The fourth thread then determines that the complete count equals the maximum value and advances the inner pointer 510 to equal the maximum value using an atomic MAX operation. In another embodiment, the inner pointer is advanced to equal the complete count (which equals the maximum value) using the atomic MAX operation.

TABLE 1 illustrates the updates to the complete count and maximum value and the advancing of the outer pointer 520 and the inner pointer 510 as the thread outputs are written as shown in FIGS. 5A-F. For this example, the sizes of thread output 501, 502, 503, 504, and 505 are 25, 40, 20, 30, and 25, respectively and the pointers are aligned at the same granularity.

At the start, the outer pointer 520 is at 85 (the first entry beyond the thread output 503). When the thread output 503 is written, the complete count and the maximum value are both updated. The updated maximum value points to the first entry beyond the thread output 503. When the thread output 502 is written, the complete count and the maximum value are both updated, but the maximum value is not changed. The fourth and fifth threads are allocated portions of the shared queue 500, causing the outer pointer to advance from 85 to 140.

When the thread output 505 is written, the complete count and the maximum value are both updated, and the maximum value is changed to 140, pointing to the first entry beyond the thread output 505. When the thread output 501 is written the complete count and the maximum value are both updated, but the maximum value is unchanged. When the thread output 504 is written the complete count and the maximum value are both updated and become equal. The inner pointer is then advanced to equal the maximum value.

TABLE 1

| Thread output written | Complete count | Maximum value | Inner pointer | Outer pointer |
|---|---|---|---|---|
| none | 0 | 0 | 0 | 85 |
| 503 | 20 | 85 | 0 | 85 |
| 502 | 60 | 85 | 0 | 140 |
| 505 | 85 | 140 | 0 | 140 |
| 501 | 110 | 140 | 0 | 140 |
| 504 | 140 | 140 | 140 | 140 |

Figure 6:
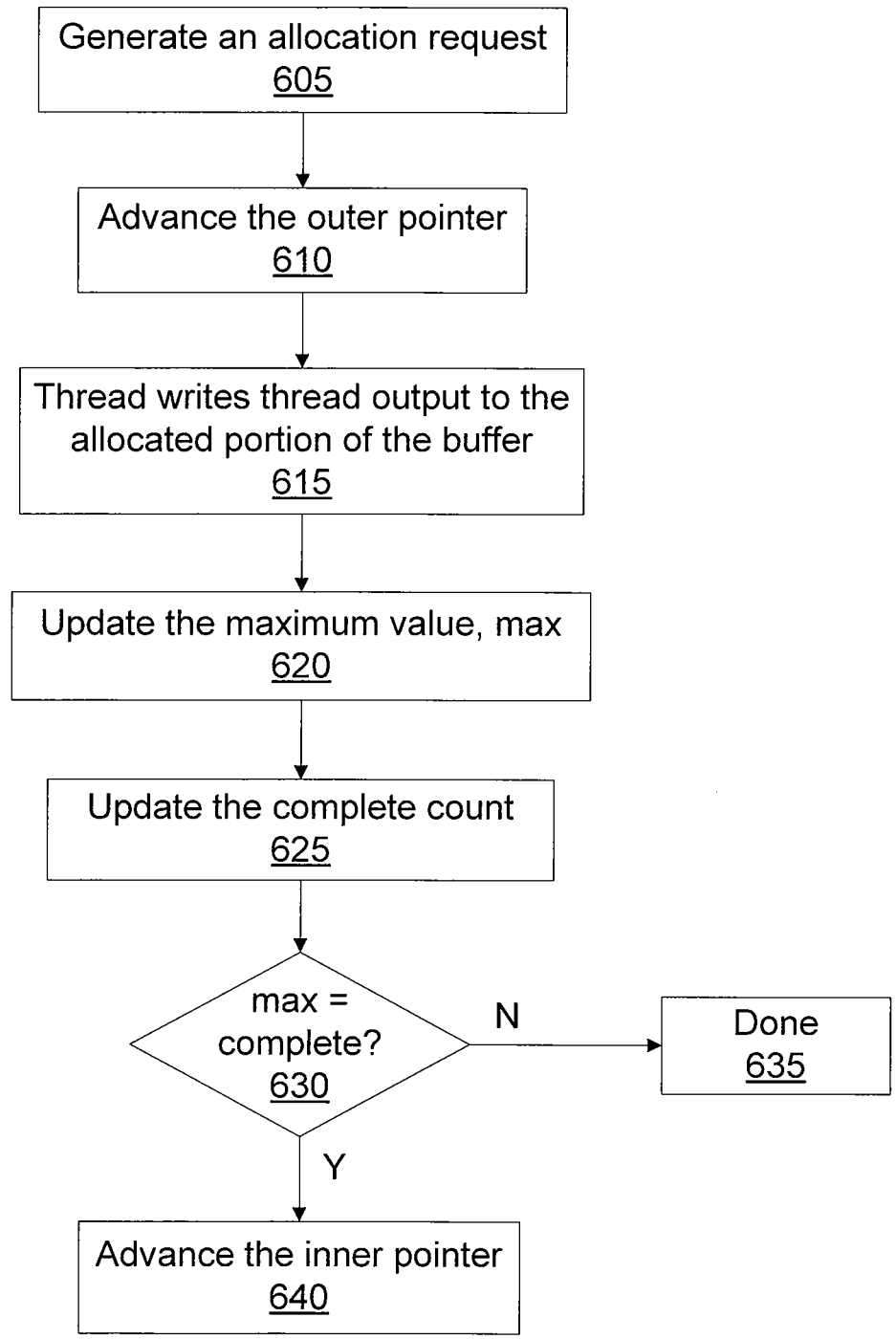
FIG. 6 is a flow diagram of method steps for accessing the shared queue by multiple threads, according to one embodiment of the present invention.

FIG. 6 is a flow diagram of method steps for accessing the shared queue by multiple producer threads, according to one embodiment of the present invention. Although the method steps are described in conjunction with the systems of FIGS. 1, 2, 3A, 3B, 3C, and 4, persons skilled in the art will understand that any system configured to perform the method steps, in any order, is within the scope of the invention.

The method steps shown in FIG. 6 are performed by each one of the multiple producer threads. At step 605 a producer thread generates an allocation request to allocate a portion of the shared queue 500 to store the thread output data. At step 610 the allocation request is performed by advancing the outer pointer 520 by the amount of data to be written by the producer thread using an atomic ADD operation. At step 615 the producer thread writes the thread output data to the portion of the shared queue 500 that was allocated to the producer thread.

The producer thread then determines if the portion of the shared queue 500 that was written by the producer thread was the only portion of the shared queue 500 that was allocated to a producer thread and had not been written. If so, then the inner pointer 510 is advanced. In order to determine that the written portion is the last portion of the shared queue 500 that was allocated, at step 620 the producer thread updates the maximum value and at step 625 the producer thread updates the complete count. Then, at step 630 the producer thread determines if the maximum value equals the complete count, and, if so, then at step 640 the producer thread advances the inner pointer 510. Otherwise, at step 635, the producer thread is done and proceeds to execute subsequent instructions.

The "wait-free" mechanism allows any producer thread that writes the shared queue to advance the inner pointer without polling or suffering a permanent failure. Multiple producer threads and one or more consumer threads may simultaneously access the shared queue and the accesses are not serialized. Additionally, the shared queue may be circular or a fixed depth queue.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as Compact Disk Read-Only Memory (CD-ROM) disks readable by a CD-ROM drive, flash memory, Read-Only Memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of submitting data to a shared queue by multiple producer threads, the method comprising:
    allocating a first portion of memory in the shared queue for storing first thread output data to be written by a first producer thread associated with the multiple producer threads by advancing an outer pointer that indicates a next entry in the shared queue that is available for allocation;
    writing, by the first producer thread, the first thread output data to the first portion of memory in the shared queue;
    determining, by the first producer thread, that the first portion of memory in the shared queue that was written was previously the only portion of memory in the shared queue that had been allocated but to which data had not yet been written; and
    in response, advancing an inner pointer that indicates a last contiguous entry in the shared queue to which data has been written.

2. The method of claim 1, further comprising, updating a maximum value that indicates a most advanced entry in the shared queue that has been written by a producer thread.

3. The method of claim 2, further comprising, updating a complete count that indicates a total quantity of thread output data written into the shared queue by the multiple producer threads.

4. The method of claim 2, wherein the updating of the maximum value comprises executing an atomic maximum operation.

5. The method of claim 2, wherein the inner pointer is advanced to equal the maximum value.

6. The method of claim 3, wherein the determining comprises:
    comparing the maximum value with the complete count; and
    determining that the first portion of memory in the shared queue that was written was the only portion of memory in the shared queue that was allocated and had not been written when the maximum value equals the complete count.

7. The method of claim 3, wherein the inner pointer is advanced to equal the complete count.

8. The method of claim 3, wherein the updating of the complete count comprises executing an atomic addition operation.

9. The method of claim 1, wherein the advancing of the inner pointer comprises executing an atomic maximum operation.

10. The method of claim 1, wherein the outer pointer is advanced using an atomic addition operation.

11. A system for submitting data to a shared queue by multiple producer threads, the system comprising:
    a memory that is configured to store a shared queue for access by a multi-threaded processor; and
    the multi-threaded processor that is configured to:
        allocate a first portion of memory in the shared queue for storing first thread output data to be written by a first producer thread associated with the multiple producer threads by advancing an outer pointer that indicates a next entry in the shared queue that is available for allocation;

write, by the first producer thread, the first thread output data to the first portion of memory in the shared queue;

determine, by the first producer thread, that the first portion of memory in the shared queue that was written was previously the only portion of memory in the shared queue that had been allocated but to which data had not yet been written; and in response, advance an inner pointer that indicates a last contiguous entry in the shared queue to which data had been written.

12. A non-transitory computer-readable storage medium storing instructions that, when executed by a processor, cause the processor to execute multiple producer threads that submit data to a shared queue, by performing the steps of:

allocating a first portion of memory in the shared queue for storing first thread output data to be written by a first producer thread associated with the multiple producer threads by advancing an outer pointer that indicates a next entry in the shared queue that is available for allocation;

writing, by the first producer thread, the first thread output data to the first portion of memory in the shared queue;

determining, by the first producer thread, that the first portion of memory in the shared queue that was written was previously the only portion of memory in the shared queue that had been allocated but to which data had not yet been written; and in response, advancing an inner pointer that indicates a last contiguous entry in the shared queue to which data has been written.

13. The non-transitory computer-readable storage medium of claim 12, further storing instructions that, when executed by the processor, cause the processor to perform the step of updating a maximum value that indicates a most advanced entry in the shared queue that has been written by a producer thread.

14. The non-transitory computer-readable storage medium of claim 13, further storing instructions that, when executed by the processor, cause the processor to perform the step of updating a complete count that indicates a total quantity of thread output data written into the shared queue by the multiple producer threads.

15. The non-transitory computer-readable storage medium of claim 13, wherein the updating of the maximum value comprises executing an atomic maximum operation.

16. The non-transitory computer-readable storage medium of claim 13, wherein the inner pointer is advanced to equal the maximum value.

17. The non-transitory computer-readable storage medium of claim 14, wherein the determining comprises:
    comparing the maximum value with the complete count; and
    determining that the first portion of memory in the shared queue that was written was the only portion of memory in the shared queue that was allocated and had not been written when the maximum value equals the complete count.

18. The non-transitory computer-readable storage medium of claim 14, wherein the inner pointer is advanced to equal the complete count.

19. The non-transitory computer-readable storage medium of claim 14, wherein the updating of the complete count comprises executing an atomic addition operation.

20. The non-transitory computer-readable storage medium of claim 12, wherein the advancing of the inner pointer comprises executing an atomic maximum operation.

* * * * *